(12) United States Patent
Zhang et al.

(10) Patent No.: US 11,685,489 B1
(45) Date of Patent: Jun. 27, 2023

(54) AEROGEL HEAT PRESERVATION RESCUE CABIN FOR SHIPS

(71) Applicant: CNBM Technology Innovation Academy (Shandong) Co., Ltd., Zaozhuang (CN)

(72) Inventors: Zhonglun Zhang, Zaozhuang (CN); Mingming Wang, Zaozhuang (CN); Zhijun Xin, Zaozhuang (CN)

(73) Assignee: CNBM Technology Innovation Academy (Shandong) Co., Ltd., Zaozhuang (CN)

( * ) Notice: Subject to any disclaimer, the term of this patent is extended or adjusted under 35 U.S.C. 154(b) by 0 days.

(21) Appl. No.: 18/089,613

(22) Filed: Dec. 28, 2022

(30) Foreign Application Priority Data

Jun. 9, 2022 (CN) .......................... 2022106440175

(51) Int. Cl.
*B63C 9/06* (2006.01)
*B63J 2/02* (2006.01)
*B63C 9/03* (2006.01)

(52) U.S. Cl.
CPC .................. *B63C 9/06* (2013.01); *B63C 9/03* (2013.01); *B63J 2/02* (2013.01)

(58) Field of Classification Search
CPC .... B63C 9/00; B63C 9/01; B63C 9/02; B63C 9/03; B63C 2009/035; B63C 9/06; B63C 9/065; B63J 2/02; B63J 2/04; B63J 2/12; B63J 3/04; B63J 2003/046; B63B 3/68; E04H 9/10; E04H 9/14; E04H 9/145; E21F 11/00
See application file for complete search history.

(56) References Cited

U.S. PATENT DOCUMENTS 3,295,151 A * 1/1967 Hall .......................... B63C 9/02
114/349
9,708,829 B2 * 7/2017 Faigen ...................... E04H 9/16

FOREIGN PATENT DOCUMENTS

| CN | 202250178 U | 5/2012 | |
|----|----|----|----|
| CN | 202863738 U | 4/2013 | |
| CN | 105035286 A | 11/2015 | |
| CN | 211417552 U | 9/2020 | |
| CN | 112591045 A | 4/2021 | |
| GB | 930114 A * | 7/1963 | ................ B63J 2/12 |
| GB | 961171 A * | 6/1964 | ................ B63J 2/12 |

* cited by examiner

*Primary Examiner* — Ajay Vasudeva
(74) *Attorney, Agent, or Firm* — Nitin Kaushik (57) ABSTRACT

The invention belongs to the technical field of ships, and relates to an aerogel heat preservation ship rescue cabin, which comprises a cabin body. The cabin body and arc-shaped plates are made of aerogel materials. Water pumping devices are symmetrically sleeved outside the cabin body near two sides. A straight pipe is connected between the two water pumping devices. Strip-shaped water outlet holes are formed at front and rear sides of the straight pipe in a penetrating manner. A heat insulation plate is sleeved on the cabin body and hollow, and two ends thereof are communicated with the water outlet holes at front and rear sides of the straight pipe. Multiple drainage holes are formed in the inner wall, opposite to the cabin body, of the heat insulation plate in a penetrating manner. Multiple evaporation holes are formed in the top of the heat insulation plate in a penetrating manner.

8 Claims, 9 Drawing Sheets

AEROGEL HEAT PRESERVATION RESCUE CABIN FOR SHIPS

CROSS-REFERENCE TO RELATED APPLICATIONS

The application claims priority to Chinese patent application No. 202210644017.5, filed on Jun. 9, 2022, the entire contents of which are incorporated herein by reference.

TECHNICAL FIELD

The present disclosure belongs to the technical field of rescue equipment for ships, and in particular relates to an aerogel heat preservation rescue cabin for ships.

BACKGROUND

Offshore floating rescue cabins are suitable for the rescue work of human disasters such as tsunamis, shipwrecks, floods, avalanches, tornadoes, and high-level rescue. In the water, each cabin can hold 5-6 people. This design is suitable for emergency rescue cabins of offshore-fishing vessels, large passenger-cargo vessels for marine transportation, ocean-going ships, and other ships.

The existing rescue cabin generally only has a simple bearing function. For some marine rescue cabins, due to the lack of suitable heat preservation devices, when the sun shines directly on the rescue cabin in the open sea, the temperature of the rescue cabin rises quickly, which makes people in the rescue cabin feel suffocated and uncomfortable, and then threatens the safety of people in the rescue cabin. Moreover, the heat preservation and insulation effect of ordinary rescue ships is relatively poor.

Therefore, it is necessary to invent an aerogel heat preservation rescue cabin for ships to solve the above problems.

SUMMARY

In view of the above problems, the present disclosure provides an aerogel heat preservation rescue cabin for ships to solve the problems proposed in the background art.

In order to achieve the above purposes, the present disclosure provides the following technical solution: the aerogel heat preservation rescue cabin for ships includes a cabin body; an aerogel layer is arranged on the outer surface of the cabin body; a cabin door is arranged at one side of the cabin body; water pumping devices are symmetrically sleeved outside the cabin body near two sides; a same straight pipe is connected between the two water pumping devices; strip-shaped water outlet holes are formed at the front and rear sides of the straight pipe in a penetrating manner; a heat insulation plate is sleeved at a position, corresponding to the straight pipe, of the cabin body, and is hollow; the two ends of the heat insulation plate are respectively communicated with the water outlet holes at the front and rear sides of the straight pipe; a plurality of drainage holes are formed in the inner wall, opposite to the cabin body, of the heat insulation plate in a penetrating manner; and a plurality of evaporation holes are formed at positions, near the two ends, of the top of the heat insulation plate in a penetrating manner.

Further, each of the two water pumping devices includes an arc-shaped pipe which are fixedly sleeved on the cabin body; the two ends of the arc-shaped pipe are connected to a same water storage box; the water storage box is fixedly connected to the top of the cabin body; the two ends of the arc-shaped pipe are respectively inserted at the front and rear sides of the water storage box in a penetrating manner; one side, close to the straight pipe, of the water storage box is communicated with the straight pipe; water inlet holes are formed in opposite sides of the two arc-shaped pipes in a penetrating manner, and are close to the bottoms of the arc-shaped pipes; annular plates are rotatably arranged in the arc-shaped pipes; a plurality of water taking tanks are fixedly connected to one side, close to the water inlet hole, of each of the annular plate; the water taking tanks are matched with the arc-shaped pipes; a strip-shaped through hole is formed in one side, far away from the annular plate, of each of the water taking tanks; teeth are uniformly arranged at the other side of the annular plate; a rotating shaft is rotatably inserted in the top of the water storage box in a penetrating manner; the rotating shaft is located at one side where the teeth of the annular plate are located; a gear is fixedly sleeved at a position, close to the bottom end, of the rotating shaft; the gear is meshed with the teeth; a plurality of connecting rods are fixedly connected to a position, close to the top end, of the rotating shaft; and wind cups are fixedly connected to the free ends of the connecting rods.

Further, the heat insulation plate is annular on the whole; two arc-shaped plates are arranged in the heat insulation plate and are symmetrically distributed at the front and rear sides of the cabin body; a plurality of grooves are horizontally formed in opposite sides of the two arc-shaped plates and are located at the lower halves of the arc-shaped plates; limiting holes are formed at two sides, corresponding to the two sides of the arc-shaped plates, of the heat insulation plate, and are arc-shaped; a limited rod is inserted in the arc-shaped plate in a penetrating manner along two side directions; the two ends of the limited rod are located outside the heat insulation plate through the corresponding limiting holes; fixed plates are fixedly connected to the two ends of the limited rod; a same floating plate is fixedly connected between the two fixed plates; an arc-shaped rod is inserted on each of the fixed plates in a sliding and penetrating mode; fixed blocks are fixedly connected to the two ends of the arc-shaped rod; the two fixed blocks are respectively connected to the exterior of the cabin body; and a spring is sleeved at a part, located on the top of the fixed plate, of the arc-shaped rod.

Further, a storage groove is formed at one side, close to the cabin body, of each of the arc-shaped plates, and is located on the top of the groove; a sponge is fixedly connected inside the storage groove; a roller is arranged at one side, close to the cabin body, of the sponge; the roller is clung to the sponge; an installing hole is formed at a position, corresponding to the roller, of the heat insulation plate; and the two ends of the roller are respectively and rotatably connected to the two sides of the installing hole.

Further, arc-shaped filter plates are arranged at the two sides of the heat insulation plate; and the filter plates are attached to the side surface of the heat insulation plate, and are fixedly sleeved on the two limited rods.

Further, filter screens are arranged in the water inlet holes and are made of corrosion-resistant materials.

Further, a water distributing pipe is inserted atone side, faraway from the straight pipe, of the water storage box in a penetrating mode; a bent pipe is connected to the free end of the water distributing pipe; the radian of the bent pipe is the same as that of the cabin body; and a plurality of water dripping holes are uniformly formed in the bottom of the bent pipe.

Further, the whole cabin body is in the shape of a capsule, and the cabin body and the arc-shaped plates are both made of aerogel materials; and when the average temperature is 25° C., the thermal conductivity of the aerogel material is less than or equal to 0.020 W/(m·K), and the bulk density is less than or equal to 200 kg/m³.

Further, a deflection groove is formed in one side, far away from the heat insulation plate, of the floating plate; and a rotating plate is articulated in the deflection groove and is hollow.

The present disclosure has the following technical effects and advantages:

1. The cabin body and the arc-shaped plates of the present disclosure are made of aerogel materials instead of common heat insulation and preservation materials. As the aerogel material has nano-scale network pores and an extremely low density, the pores in the aerogel material tend to be infinite, and each pore wall has the effect of a heat shield, so that the effect of "infinitely many heat shields" is produced, and the heat radiation is minimized. When the pore size of the aerogel is less than 70 mu, air molecules in the pores lose the ability to flow freely, resulting in an approximate vacuum state, which makes the convective heat exchange impossible. Moreover, due to the extremely low density, large surface area, and loose skeleton of the aerogel, the infinite number of nano-pores make the heat be conducted on the pore walls of the aerogel. The "infinite long loose path" effect formed by the infinite number of pore walls makes the capacity of heat conduction of the aerogel decrease to the minimum limit, so that the heat insulation and preservation effect is improved. In summary, the three ways of heat conduction are effectively treated by aerogel, that is, heat radiation, convective heat exchange, and heat conduction are isolated. Compared with common heat insulation and preservation materials, the aerogel material has the advantages that when the average temperature is 25° C., the heat conductivity of the aerogel material is less than or equal to 0.020 W/(m·K), and the bulk density is less than or equal to 200 kg/m³. In addition, within a certain range, the heat conductivity of common heat insulation and preservation materials increases with temperature, while the heat conductivity of the aerogel changes little with the temperature, and thus, the stability of the heat insulation and preservation effect of the cabin body is improved.

2. When the sea wind blows on the wind cups, the wind cups drive the rotating shafts to start rotating, and the gears on the rotating shafts can drive the annular plates to move in the arc-shaped pipes through the teeth on the annular plates. In this process, when the water taking tanks pass through positions of the water inlet holes, seawater can enter the water taking tanks from openings of the water taking tanks; when the water taking tanks and the water inlet holes are gradually staggered, the water in the water taking tanks can stay in the water taking tanks under the obstruction of the inner walls of the arc-shaped pipes, and gradually enters the water storage boxes along with the rotation of the annular plates; and after the water tanking tanks enter the water storage boxes, part of the water in the water taking tanks enters the heat insulation plate through the straight pipe, and finally drips on the surface of the cabin body through the drainage holes in the heat insulation plate, thereby cooling the cabin body.

3. When there is wind on the sea, the sea water impacts on the rotating plates and the floating plates under the wind, at this time, the rotating plates and the floating plates can drive the arc-shaped plates to move upwards, and in this process, with the upward movement of the floating plates, the floating plates can drive the fixed plates to squeeze the springs along the arc-shaped rods, so that part of the impact force of the sea water on the cabin body can be converted into the elastic potential energy of the springs, while the other part of the impact force can be converted into the power of the floating plates, the rotating plates and the arc-shaped plates, thus, the impact of the sea water on the cabin body is reduced, and the relative stability of the cabin body is ensured.

4. When the wind on the sea stops, the floating plates can stably float on the sea, at this time, the sponges no longer move relative to the rollers, so that the water originally absorbed in the sponges can be stored in the sponges for a long time. With the irradiation of the sun on the heat insulation plate, when the temperature in the heat insulation plate rises, the water in the sponges can slowly evaporate, and takes away the heat in the heat insulation plate through the evaporation holes, and thus, the relative stability of the temperature of the cabin body is ensured. Meanwhile, as the evaporation holes are located on the top of the insulation plate, in the process of water evaporation, when water vapor contacts with the top of the inner side of the insulation plate, part of the water vapor condenses and eventually flows back into the sponges along the inner wall of the insulation plate, and thus, the time for dissipating heat of the cabin body by the water in the sponge is prolonged.

Other characteristics and advantages of the present disclosure will be stated in the following specification, moreover, partial characteristics and advantages will become obvious in the specification, or be known by implementing the present disclosure. The objective and other advantages of the present disclosure may be realized and acquired by the structures pointed out in the description and drawings.

BRIEF DESCRIPTION OF DRAWINGS

In order to describe the embodiments of the present disclosure or the technical solutions in the prior art more clearly, the drawings required to be used in the description of the embodiments or the prior art will be briefly introduced below. It is apparent that the drawings described below are only some embodiments of the present disclosure. Those of ordinary skill in the art may further obtain other drawings according to these drawings without creative work.

In figures: 1. Rescue cabin; 2. Cabin door; 3. Water pumping device; 31. Arc-shaped pipe; 32. Water storage box; 33. Annular plate; 34. Water taking tank; 35. Rotating shaft; 36. Gear; 37. Wind cup; 4. Straight pipe; 5. Heat insulation plate; 6. Drainage hole; 7. Evaporation hole; 8. Arc-shaped plate; 9. Groove; 10. Limited rod; 11. Fixed plate; 12. Floating plate; 13. Arc-shaped rod; 14. Spring; 15. Sponge; 16. Roller; 17. Filter plate; 18. Filter screen; 19. Water distributing pipe; 20. Bent pipe; 21. Rotating plate; 22. Limiting hole; 23. water outlet hole; 24. Water dripping hole; 25. Fixed block; 26. Storage groove; 27. Through hole; and 28. water inlet hole.

DETAILED DESCRIPTION OF THE EMBODIMENTS

In order to make objects, technical solutions and advantages of embodiments of the present disclosure clearer, the technical solutions in the embodiments of the present disclosure are clearly and completely described below in conjunction with the accompanying drawings in the embodiments of the present disclosure, and it is apparent that the described embodiments are parts of embodiments rather than all embodiments of the present disclosure. Based on the embodiments of the present disclosure, all other embodiments obtained by a person of ordinary skill in the art without involving any inventive effort all fall within the scope of the present disclosure.

The present disclosure provides an aerogel heat preservation rescue cabin for ships as shown in FIG. 1 to FIG. 9. The aerogel heat preservation rescue cabin for ships includes a cabin body 1. A cabin door 2 is arranged at one side of the cabin body 1. Water pumping devices 3 are symmetrically sleeved outside the cabin body 1 near two sides. A same straight pipe 4 is connected between the two water pumping devices 3. Strip-shaped water outlet holes 23 are formed at the front and rear sides of the straight pipe 4 in a penetrating manner. A heat insulation plate 5 is sleeved at a position, corresponding to the straight pipe 4, of the cabin body 1, and is hollow. The two ends of the heat insulation plate 5 are respectively communicated with the water outlet holes 23 at the front and rear sides of the straight pipe 4. A plurality of drainage holes 6 are formed in the inner wall, opposite to the cabin body 1, of the heat insulation plate 5 in a penetrating manner. A plurality of evaporation holes are formed at positions, near the two ends, of the top of the heat insulation plate in a penetrating manner. The whole cabin body 1 is in the shape of a capsule, and the cabin body 1 and the arc-shaped plate 8 are both made of aerogel materials.

The cabin body 1 and the arc-shaped plates 8 of the present disclosure are made of the aerogel materials instead of common heat insulation and preservation materials. As the aerogel material has nano-scale network pores and an extremely low density, the pores in the aerogel material tend to be infinite, and each pore wall has the effect of a heat shield, so that the effect of "infinitely many heat shields" is produced, and the heat radiation is minimized. When the pore size of the aerogel is less than 70 nm, air molecules in the pores lose the ability to flow freely, resulting in an approximate vacuum state, which makes the convective heat exchange impossible. Moreover, due to the extremely low density, large surface area and loose skeleton of the aerogel, the infinite number of nano-pores make the heat be conducted on the pore walls of the aerogel. The "infinite long loose path" effect formed by the infinite number of pore walls makes the capacity of heat conduction of the aerogel decrease to the minimum limit, so that the heat insulation and preservation effect is improved. In summary, the three ways of heat conduction are effectively treated by aerogel, that is, heat radiation, convective heat exchange, and heat conduction are isolated. Compared with common heat insulation and preservation materials, the aerogel material has the advantages that the aerogel has the lowest heat conductivity, when the average temperature is 25° C., the heat conductivity of the aerogel material is less than or equal to 0.020 W/(m·K); in addition, the heat conductivity of common heat insulation and preservation materials increases with temperature, while the heat conductivity of the aerogel changes little with the temperature, and thus, the stability of the heat insulation and preservation effect of the cabin body is improved.

When the wind on the sea blows on the water pumping devices 3, the water pumping devices 3 can suck seawater into the straight pipe 4, and then the water in the straight pipe 4 can enter the heat insulation plate 5, and finally drips on the surface of the cabin body 1 through the drainage holes 6 in the heat insulation plate 5, thereby cooling the cabin body 1. At the same time, as the heat insulation plate 5 is hollow, a cavity inside the heat insulation plate 5 can play a certain heat insulation effect, and then when the sun shines directly on the heat insulation plate 5, the heat insulation plate 5 can reduce the rise speed of the temperature of the cabin body 1.

In addition, with the rise of the internal temperature of the heat insulation plate 5, the water in the heat insulation plate 5 evaporates, and takes out heat from the evaporation holes 7, and thus, the purpose of cooling the heat insulation plate 5 and the cabin body 1 is achieved. In addition, when evaporated water vapor contacts with the inner wall of the heat insulation plate 5, this part of water vapor condenses, and falls back into the sea along the inner wall of the heat insulation plate 5, thus, the purpose of cooling the heat insulation plate 5 can also be achieved, and the heat insulation plate 5 cooperates with the water pumping devices 3 to better control the temperature of the cabin body 1.

Figure 1:
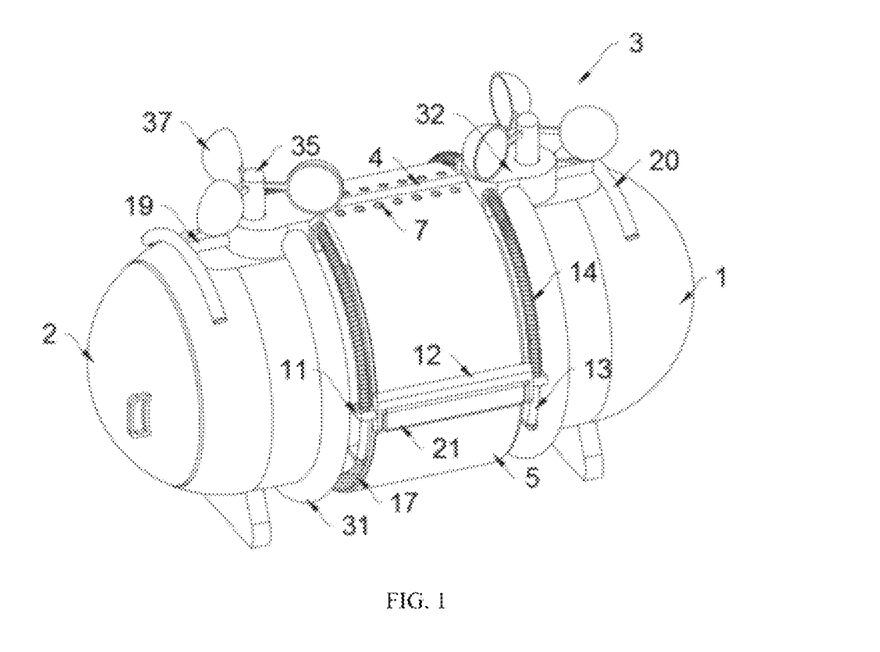
FIG. 1 is a schematic diagram of a first three-dimensional structure of the present disclosure.
Figure 2:
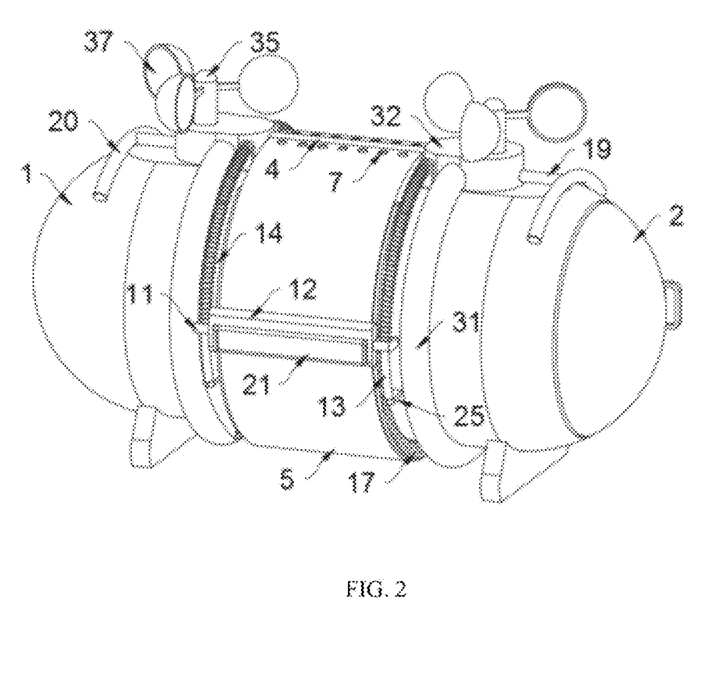
FIG. 2 is a schematic diagram of a second three-dimensional structure of the present disclosure.
Figure 3:
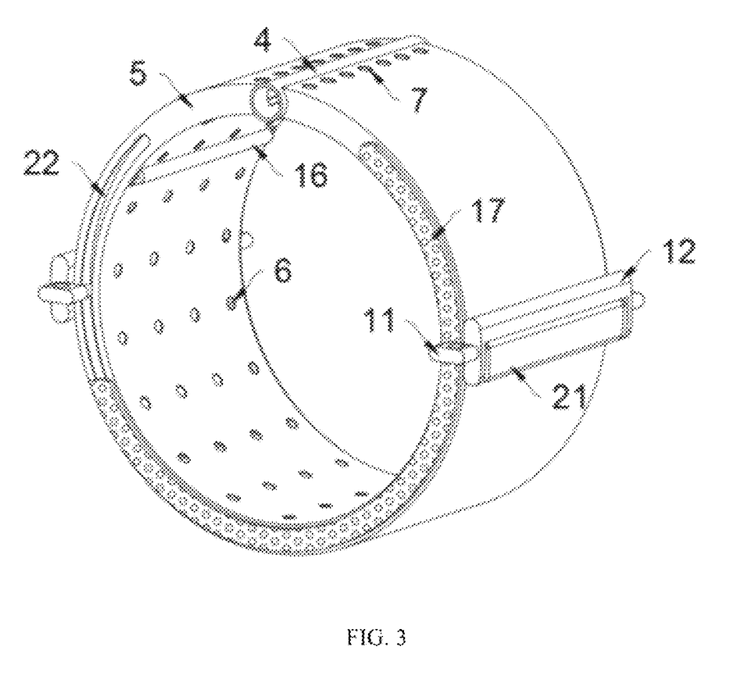
FIG. 3 is a schematic diagram of a three-dimensional structure of a heat insulation plate according to the present disclosure.
Figure 4:
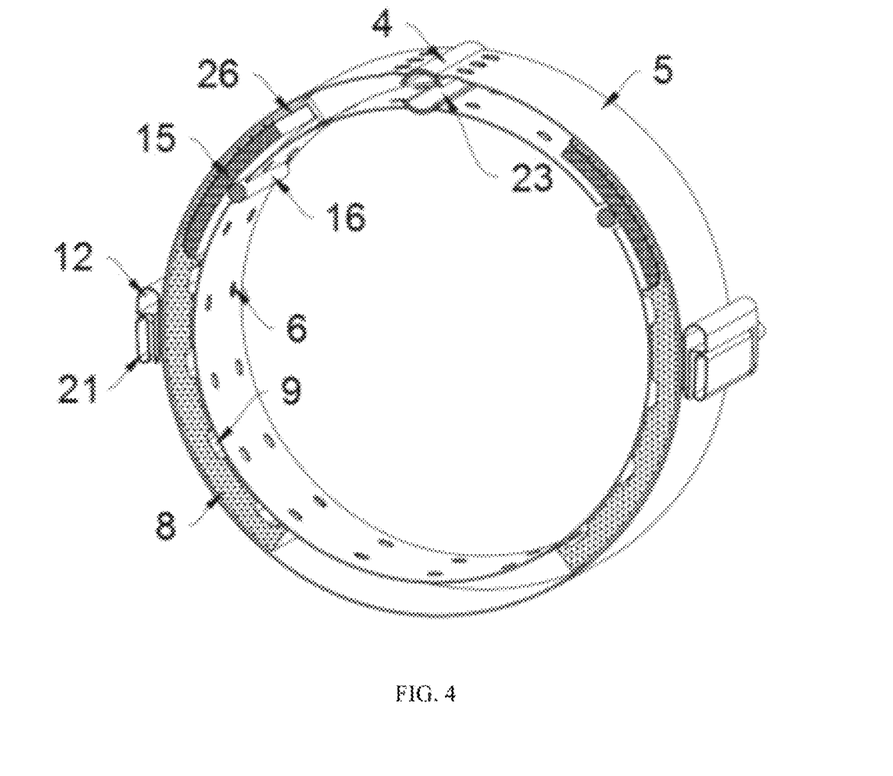
FIG. 4 is a sectional view of a three-dimensional structure shown in FIG. 3 according to the present disclosure.
Figure 5:
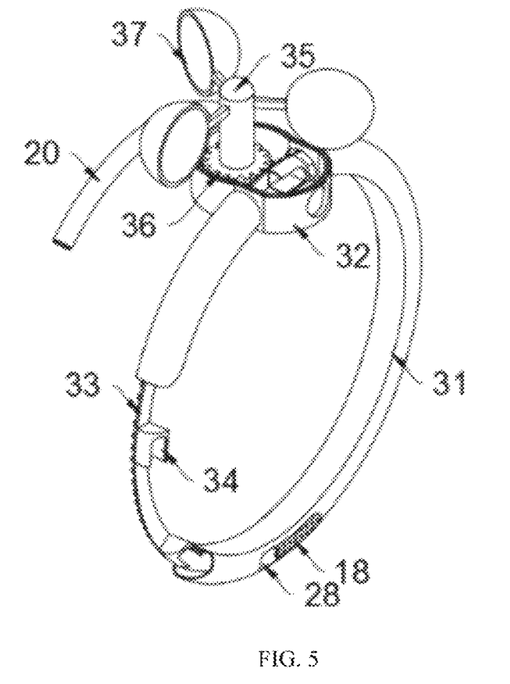
FIG. 5 is a sectional view of a first three-dimensional structure of a water pumping device, a water distributing pipe, and a bent pipe according to the present disclosure.
Figure 6:
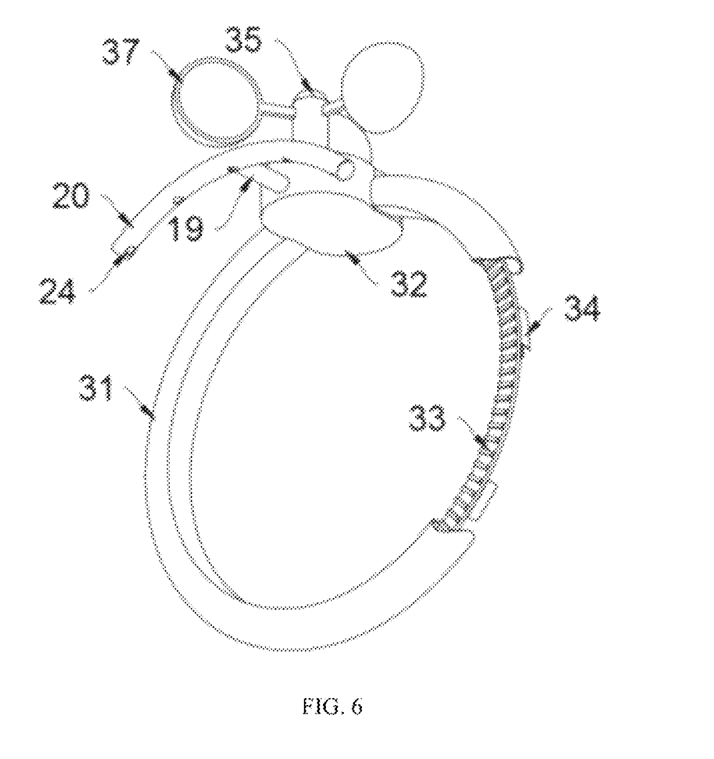
FIG. 6 is a sectional view of a second three-dimensional structure of a water pumping device, a water distributing pipe, and a bent pipe according to the present disclosure.
Figure 7:
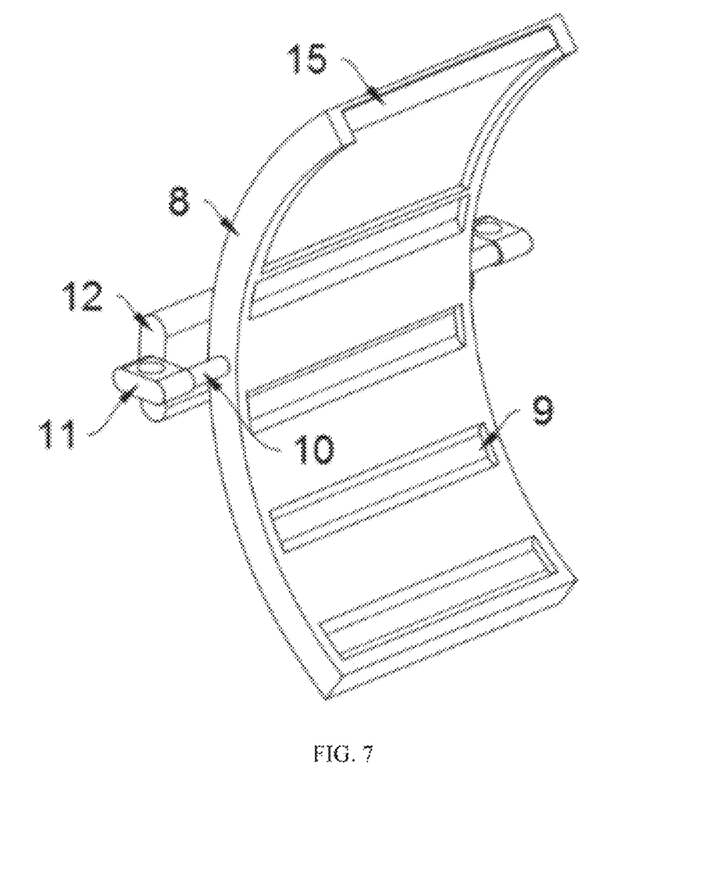
FIG. 7 is a schematic diagram of a first three-dimensional structure of an arc-shaped plate, a floating plate, and a rotating plate according to the present disclosure.
Figure 8:
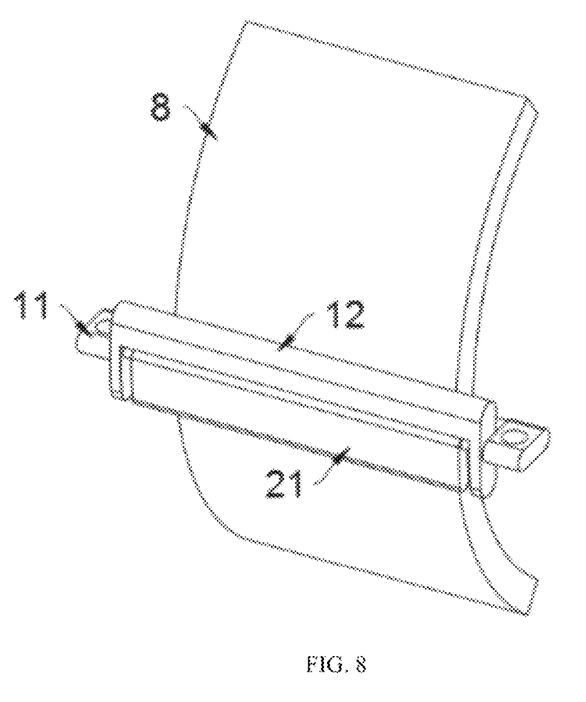
FIG. 8 is a schematic diagram of a second three-dimensional structure of an arc-shaped plate, a floating plate, and a rotating plate according to the present disclosure.
Figure 9:
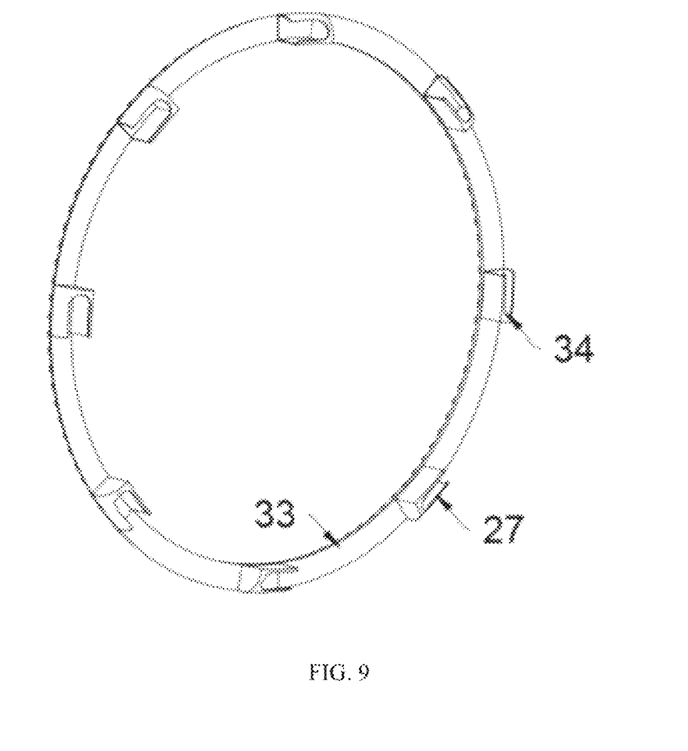
FIG. 9 is a schematic diagram of a three-dimensional structure of an annular plate according to the present disclosure.

As shown in FIG. 1, FIG. 5 and FIG. 6, each of the two water pumping devices 3 includes an arc-shaped pipe 31 which is fixedly sleeved on the cabin body 1; the two ends of the arc-shaped pipe 31 are connected to a same water storage box 32; the water storage box 32 is fixedly connected to the top of the cabin body 1; the two ends of the arc-shaped pipes 31 are respectively inserted at the front and rear sides of the water storage box 32 in a penetrating manner; one side, close to the straight pipe 4, of the water storage box 32 is communicated with the straight pipe 4; water inlet holes 28 are formed in opposite sides of the two arc-shaped pipes 31 in a penetrating manner, and are close to the bottoms of the arc-shaped pipes 31; annular plates 33 are rotatably arranged in the arc-shaped pipes 31; a plurality of water taking tanks 34 are fixedly connected to one side, close to the water inlet holes 28, of each of the annular plates 33; the water taking tanks 34 are matched with the arc-shaped pipes 31; a strip-shaped through hole 27 is formed in one side, far away from the annular plate 33, of each of the water taking tanks 34; teeth are uniformly arranged at the other side of the annular plate 33; a rotating shaft 35 is rotatably inserted in the top of the water storage box 32 in a penetrating manner; the rotating shaft 35 is located at one side where the teeth of the annular plate are located; a gear 36 is fixedly sleeved at a position, close to the bottom end, of the rotating shaft 35; the gear 36 is meshed with the teeth; a plurality of connecting rods are fixedly connected to a position, close to the top end, of the rotating shaft 35; wind cups 37 are fixedly connected to the free ends of the connecting rods; filter screens 18 are arranged in the water inlet holes 28 and are made of corrosion-resistant materials; a water distributing pipe 19 is inserted at one side, far away from the straight pipe 4, of the water storage box 32 in a penetrating mode; a bent pipe 20 is connected to the free end of the water distributing pipe 19; the radian of the bent pipe 20 is the same as that of the cabin body 1; and a plurality of water dripping holes 24 are uniformly formed in the bottom of the bent pipe 20.

When the sea wind blows on the wind cups 37, the wind cups 37 drive the rotating shafts 35 to start rotating, and the gears 36 on the rotating shafts 35 can drive the annular plates 33 to move in the arc-shaped pipes 31 through the teeth on the annular plates 33. In addition, when the aerogel heat preservation rescue cabin floats on the water surface, the water inlet holes 28 of the arc-shaped pipes 31 are partially immersed in water, and at this time, seawater enters the arc-shaped pipes 31 through the water inlet holes 28. Therefore, when the water taking tanks 34 pass through the positions of the water inlet holes 28, the water in the arc-shaped pipes 31 enters the water taking tanks 34 through the through holes 27 at one side of the water taking tank 34. When the water taking tanks 34 are driven by the annular plates 33 to move upward gradually, the through holes 27 in the sides of the water taking tanks 34 are gradually closed by the inner walls of the arc-shaped pipes 31 along with the gradual staggering of the through holes 27 in the sides of the water taking tanks 34 and the water inlet holes 28, and at this time, the seawater can stay in the water taking tanks 34 and enters the water storage boxes 32 with the rotation of the annular plates 33. When the water taking tanks 34 enter the water storage boxes 32, the water in the water taking tanks 34 flows out from the through holes 27 and the openings in the sides of the water taking tanks 34, and finally drip on the surface of the cabin body 1 through the drainage holes 6 in the heat insulation plate 5, thereby cooling the cabin body 1. The other part of the water can enter the bent pipes 20 through the water distributing pipes 19, and finally drips on both sides of the cabin body 1 through the dripping holes 24 at the bottoms of the bent pipes 20 to cool the whole surface of the cabin body 1 in cooperation with the water entering the heat insulation plate 5, and thus, the relative stability of the temperature of the cabin body 1 is ensured.

As shown in FIG. 3, FIG. 4, FIG. 7 and FIG. 8, the heat insulation plate 5 is annular on the whole; two arc-shaped plates 8 are arranged in the heat insulation plate 5 and are symmetrically distributed at front and rear sides of the cabin body 1; a plurality of grooves 9 are horizontally formed in opposite sides of the two arc-shaped plates 8 and are located at the lower halves of the arc-shaped plates 8; limiting holes 22 are formed at the two sides, corresponding to the two sides of the arc-shaped plate 8, of the heat insulation plate 5, and are arc-shaped, a limited rod 10 is inserted in the arc-shaped plate 8 in a penetrating manner along two side directions; the two ends of the limited rod 10 are located outside the heat insulation plate 5 through the corresponding limiting holes 22; fixed plates 11 are fixedly connected to the two ends of the limited rods 10; a same floating plate 12 is fixedly connected between the two fixed plates 11; an arc-shaped rod 13 is inserted on each of the fixed plates 11 in a sliding and penetrating mode; fixed blocks 25 are fixedly connected to the two ends of the arc-shaped rod 13; the two fixed blocks 25 are respectively connected to the exterior of the cabin body 1; and a spring 21 is sleeved at a part, located on the top of the fixed plate 11, of the arc-shaped rod 13. Arc-shaped filter plates 17 are arranged at the two sides of the heat insulation plate 5; and the filter plates 17 are attached to the side surface of the heat insulation plate 5, and are fixedly sleeved on the two limited rods 10. A deflection groove is formed in one side, far away from the heat insulation plate 5, of the floating plate 12; and a rotating plate 21 is articulated in the deflection groove and is hollow.

When the cabin body 1 floats on the sea, the rotating plates 21 can rotate out of the interiors of the deflection grooves under the action of buoyancy and float on the sea. At this time, the contact area between the floating plates 12 and seawater can be increased by the rotating plates 21, and the two arc-shaped plates 8 stay at corresponding positions in the heat insulation plate 5 under the action of buoyancy of the floating plates 12 and the rotating plates 21. When there is wind on the sea, the sea water impacts on the rotating plates 21 and the floating plates 12 under the wind. At this time, the rotating plates 21 and the floating plates 12 can drive the arc-shaped plates 8 to move upwards, and in this process, with the upward movement of the floating plates 12, the floating plates 12 can drive the fixed plates 11 to squeeze the springs 14 along the arc-shaped rods 13, so that part of the impact force of the sea water on the cabin body 1 can be converted into the elastic potential energy of the springs 14, while the other part of the impact force can be converted into the power of the floating plates 12, the rotating plates 21 and the arc-shaped plates 8, thus, the impact of the sea water on the cabin body 1 is reduced, and the relative stability of the cabin body 1 is ensured.

In addition, with the upward movement of the arc-shaped plates 8, the grooves 9 in the arc-shaped plates 8, which was originally immersed in seawater, can drive the seawater upward to shower on the heat insulation plate 5 and cool the part of the cabin body 1 on the sea surface through the drainage holes 6 in the heat insulation plate 5;

In addition, during the up-and-down movement of the floating plates 12, the filter plates 17 can move together with the floating plates 12, and always shield limiting holes 22, thereby preventing garbage or larger impurities in seawater from entering the heat insulation plate 5.

As shown in FIG. 3, FIG. 4, FIG. 7 and FIG. 8, a storage groove 26 is formed at one side, close to the cabin body 1, of each of the arc-shaped plates 8, and is located on the top of the groove 9; a sponge 15 is fixedly connected inside the storage groove 26; a roller 16 is arranged at one side, close to the cabin body 1, of the sponge 15; the roller 16 is clung to the sponge 15; an installing hole is formed in a position, corresponding to the roller, of the heat insulation plate 5; and the two ends of the roller 16 are respectively and rotatably connected to the two sides of the installing hole.

When there is wind on the sea, the water taking tanks 34 can transport enough water to the water storage boxes 32, then the water in the water storage boxes 32 can enter the heat insulation plate 5 through the straight pipe 4, and then part of the water can be absorbed by the sponges 15, while the other part of the water can drip on the surface of the cabin body 1 through the drainage holes 6 in the heat insulation plate 5. When there is wind, the floating plates 12 move up and down with the fluctuation of the water surface, at this time, the floating plates 12 drive the arc-shaped plates 8 to move up and down together through the limited rods 10, so that the sponges 15 can move against the rollers 16, and the excess water in the sponges 15 can quickly drip on the surface of the cabin body 1 through the drainage holes 6 in the heat insulation plate 5 under the extrusion of the rollers 16, thereby cooling the cabin body 1.

When the wind on the sea stops, the floating plates 12 can stably float on the sea, and at this time, the sponges 15 no longer move relative to the rollers 16, so that the water originally absorbed in the sponges 15 can be stored in the sponges 15 for a long time. With the irradiation of the sun on the heat insulation plate 15, when the temperature in the heat insulation plate 15 rises, the water in the sponges 15 can slowly evaporate, and takes way the heat in the heat insulation plate 5 through the evaporation holes 7, and thus, the relative stability of the temperature of the cabin body 1 is ensured. Meanwhile, as the evaporation holes 7 are located on the top of the insulation plate 5, in the process of water evaporation, when water vapor contacts with the top of the inner side of the insulation plate 5, part of the water vapor condenses and eventually flows back into the sponges 15 along the inner wall of the insulation plate 5, and thus, the time for dissipating heat of the cabin body 1 by the water in the sponges 15 is prolonged.

Although the present disclosure is illustrated in detail with reference to the foregoing embodiments, it should be understood by those skilled in the art that, modifications may still be made on the technical solutions written by the foregoing embodiments, or equivalent replacements are made on part of technical features; and these modifications or replacements do not make the essence of the corresponding technical solutions depart from the spirit and scope of the technical solution of the various embodiments of the present disclosure.

What is claimed is:

1. An aerogel heat preservation rescue cabin for ships, comprising a cabin body, wherein a cabin door (2) is arranged at one side of the cabin body (1); two water pumping devices (3) are symmetrically sleeved outside the cabin body (1) near two sides; a same straight pipe (4) is connected between the two water pumping devices (3); strip-shaped water outlet holes (23) are formed at front and rear sides of the straight pipe (4) in a penetrating manner; a heat insulation plate (5) is sleeved at a position, corresponding to the straight pipe (4), of the cabin body (1), and is hollow; two ends of the heat insulation plate (5) are respectively communicated with the water outlet holes (23) at the front and rear sides of the straight pipe (4); a plurality of drainage holes (6) are formed in an inner wall, opposite to the cabin body (1), of the heat insulation plate (5) in a penetrating manner; a plurality of evaporation holes (7) are formed at positions, near the two ends, of a top of the heat insulation plate (5) in a penetrating manner;

each of the two water pumping devices (3) comprises an arc-shaped pipe (31) which is fixedly sleeved on the cabin body (1); two ends of the arc-shaped pipe (31) are connected to a same water storage box (32); the water storage box (32) is fixedly connected to a top of the cabin body (1); the two ends of the arc-shaped pipe (31) are respectively inserted at front and rear sides of the water storage box (32) in a penetrating manner; one of the sides, close to the straight pipe (4), of the water storage box (32) is communicated with the straight pipe (4); water inlet holes (28) are formed in opposite sides of the two arc-shaped pipes (31) in a penetrating manner, and are close to bottoms of the arc-shaped pipes (31); annular plates (33) are rotatably arranged in the arc-shaped pipes (31); a plurality of water taking tanks (34) are fixedly connected to one side, close to the water inlet hole (28), of each of the annular plate (33); the water taking tanks (34) are matched with the arc-shaped pipes (31); a strip-shaped through hole (27) is formed in one side, far away from the annular plate (33), of each of the water taking tanks (34); teeth are uniformly arranged at an other side of the annular plate (33); a rotating shaft (35) is rotatably inserted in a top of the water storage box (32) in a penetrating manner; the rotating shaft (35) is located at one side where the teeth of the annular plate are located; a gear (36) is fixedly sleeved at a position, close to a bottom end, of the rotating shaft (35); the gear (36) is meshed with the teeth; a plurality of connecting rods are fixedly connected to a position, close to a top, of the rotating shaft (35); and wind cups (37) are fixedly connected to free ends of the connecting rods.

2. The aerogel heat preservation rescue cabin for ships according to claim 1, wherein the heat insulation plate (5) is annular on the whole; two arc-shaped plates (8) are arranged in the heat insulation plate (5) and are symmetrically distributed at the front and rear sides of the cabin body (1); a plurality of grooves (9) are horizontally formed in opposite sides of the two arc-shaped plates (8) and are located at the lower halves of the arc-shaped plates (8); limiting holes (22) are formed at the two sides, corresponding to the two sides of the arc-shaped plates (8), of the heat insulation plate (5), and are arc-shaped; a limited rod (10) is inserted in each arc-shaped plate (8) in a penetrating manner along two side directions; the two ends of the limited rod (10) are located outside the heat insulation plate (5) through the corresponding limiting holes (22); fixed plates (11) are fixedly connected to two ends of the limited rod (10); a same floating plate (12) is fixedly connected between the two fixed plates (11); an arc-shaped rod (13) is inserted on each of the fixed plates (11) in a sliding and penetrating mode; two fixed blocks (25) are fixedly connected to the two ends of the arc-shaped rod (13); the two fixed blocks (25) are respectively connected to the exterior of the cabin body (1); and a spring (14) is sleeved at a part, located on the top of the fixed plate (11), of the arc-shaped rod (13).

3. The aerogel heat preservation rescue cabin for ships according to claim 2, wherein a storage groove (26) is formed at one side, close to the cabin body (1), of each of the arc-shaped plates (8), and is located on the top of the grooves (9); a sponge (15) is fixedly connected inside the storage groove (26); a roller (16) is arranged at one side, close to the cabin body (1), of the sponge (15); the roller (16) is clung to the sponge (15); an installing hole is formed at a position, corresponding to the roller (16), of the heat insulation plate (5); and the two ends of the roller (16) are respectively and rotatably connected to the two sides of the installing hole.

4. The aerogel heat preservation rescue cabin for ships according to claim 3, wherein arc-shaped filter plates (17) are arranged at the two sides of the heat insulation plate (5); and the filter plates (17) are attached to the side surface of the heat insulation plate (5), and are fixedly sleeved on two limited rods (10).

5. The aerogel heat preservation rescue cabin for ships according to claim 4, wherein a deflection groove is formed in one side, far away from the heat insulation plate (5), of the floating plate (12); and a rotating plate (21) is articulated in the deflection groove and is hollow.

6. The aerogel heat preservation rescue cabin for ships according to claim 2, wherein the whole cabin body (1) is in the shape of a capsule, and the cabin body (1) and the arc-shaped plate (8) are both made of aerogel materials; and when the average temperature is 25° C., the thermal conductivity of the aerogel material is less than or equal to 0.020 W/(mK), and the bulk density is less than or equal to 200 kg/m$^3$.

7. The aerogel heat preservation rescue cabin for ships according to claim 1, wherein filter screens (18) are arranged in the water inlet holes (28) and are made of corrosion-resistant materials.

8. The aerogel heat preservation rescue cabin for ships according to claim 1, wherein a water distributing pipe (19) is inserted at one side, far away from the straight pipe (4), of the water storage box (32) in a penetrating mode; a bent pipe (20) is connected to the free end of the water distributing pipe (19); the radian of the bent pipe (20) is the same as that of the cabin body (1); and a plurality of water dripping holes (24) are uniformly formed in the bottom of the bent pipe (20).

* * * * *